May 29, 1923.
W. A. KITTS, JR
1,456,697
BLOW-OFF VALVE
Filed Oct. 6, 1919
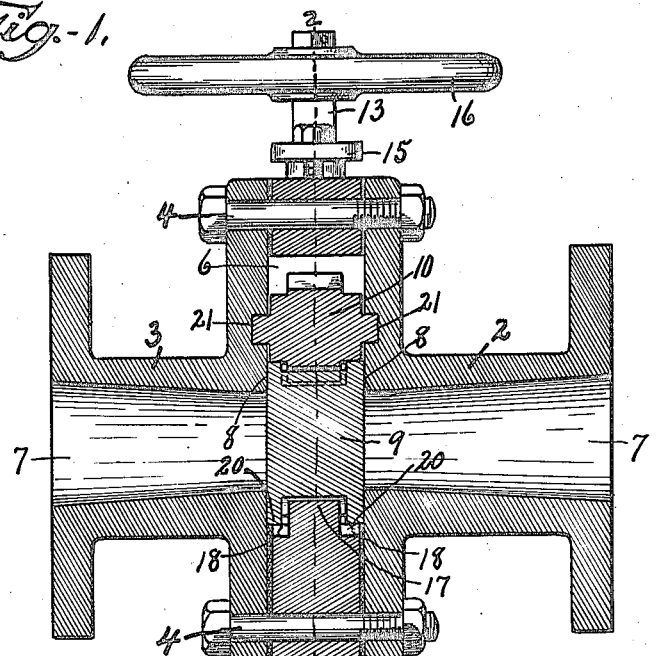
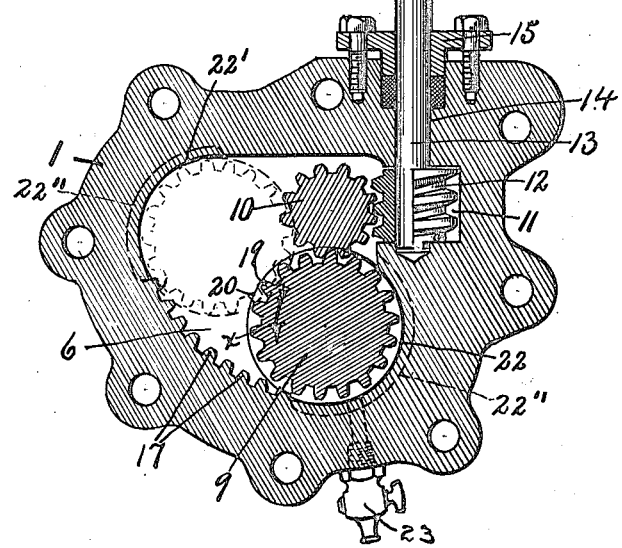

Patented May 29, 1923.

1,456,697

UNITED STATES PATENT OFFICE.

WILLARD A. KITTS, JR., OF MOUNTAIN LAKES, NEW JERSEY, ASSIGNOR TO ISAAC L. KITTS, OF FORT MYER, VIRGINIA.

BLOW-OFF VALVE.

Application filed October 6, 1919. Serial No. 328,799.

*To all whom it may concern:*

Be it known that I, WILLARD A. KITTS, Jr., of Mountain Lakes, in the county of Morris, in the State of New Jersey, have invented new and useful Improvements in Blow-Off Valves, of which the following, taken in connection with the accompanying drawings, is a full, clear, and exact description.

This invention relates to certain improvements in blow-off valves of the class set forth in my pending application Serial No. 312,874, filed July 23, 1919, for permitting the removal of sediment and other foreign matter which may accumulate in steam boilers and other fluid pressure containers in which a gate-valve is movable in the valve chamber to and from a position across the discharge passage and against opposed seats surrounding said passage with a rolling, sliding motion produced by suitable gearing capable of holding the valve or gate in any position of adjustment.

This action, together with the fluid pressure in one direction against the gate causes more or less wear of different portions of the contacting faces of the valve and seats and the primary object of my present invention is to provide means whereby the gate or valve may be freely rotated about its axis when in its extreme closed position or in its extreme opened position without shifting the gate radially or changing the position of its axis, whereby the contacting faces of the gate and seats may be closely fitted one to the other at all points to reduce the possibility of leakage to a minimum.

Other objects and uses relating to specific structural features will be brought out in the following description.

In the drawings:

Figure 1 is a longitudinal sectional view of a blow-off valve embodying the features of my invention.

Figure 2 is a transverse sectional view taken on the line 2—2, Figure 1, except that a portion of the worm and its supporting shaft are shown in elevation, the dotted lines indicating the open position of the valve or gate.

As illustrated this blow-off valve comprises a three-part case consisting of a chambered central section or ring —1— and opposite end sections —2— and —3—, all of which are firmly secured together by bolts —4— with suitable packings —5— between their meeting faces to reduce the liability of leakage.

The central section or ring —1— is provided with a central chamber —6— communicating with co-axial central longitudinal passages —7— in the sections —2— and —3— which constitute what may be termed the discharge passage of the boiler or other container to which the blow-off valve as a whole is adapted to be connected or secured in any well known manner not necessary to herein illustrate or describe.

The inner end faces of the end sections —2— and —3— immediately surrounding the passage —7— constitute opposed valve seats —8— surrounding said passage and spaced a distance apart corresponding, in this instance, to the width of the ring —1— for receiving between them a gate or valve —9— and an operating member —10—, said chamber being extended at —11— to receive another valve-operating member —12— co-operating in a manner presently described with the member —10— for rotating the valve gate —9— about its axis, the member 12—being secured to a shaft —13— which is journaled in a suitable bearing —14— in the ring —1— and extends through a gland —15— to the exterior of the ring where it is provided with a handwheel —16— for rotating the said shaft at will when it is desired to operate the valve or gate —9—.

The form of the chamber —6— is approximately that of a sector of a circle having its center in the axis of the pinion —10—, the length of the arc being substantially equal to twice the diameter of the gate —9— and its outer wall concentric with the pinion —10— and provided with a toothed rack —17— and circular bearings or tracks —18— at opposite sides of the teeth along which the valve or gate —9— is adapted to roll in its opening and closing movement.

The gate —9— is circular and is provided with peripheral teeth —19— and circular bearings —20— at opposite sides of the teeth which latter are adapted to engage the teeth —17— for causing the gate to be positively opened with a rolling motion when rotated in one direction and to positively close with a reverse rolling motion when rotated in the opposite direction, while the circular bearings —20— roll along and upon the tracks —18—.

The member —10— preferably consists of a spur gear having its ends reduced in diameter and journaled in suitable sockets —21— in the inner faces of the end sections —2— and —3— of the valve case for supporting said gear mainly at one side of the path of movement of the gate or valve —9—, said gear meshing with the teeth of the valve or gate and also with the worm —12— so that when the latter is rotated by the turning of the shaft —13— through the medium of the handwheel —16—, rotary motion will be imparted to the gate.

When the valve —9— is in its closed position, it is co-axial with the passage —7— and is movable from that position to its extreme opened position through an arc approximately equal to the diameter of the gate so that when fully opened it will clear the passage —7—.

This arc of rolling movement of the valve about the axis of the gear —10— is indicated by the radial dotted lines passing from the axis of said gear through the axis of the closed valve and also through the axis of the opened valve.

The opposite ends of the toothed rack formed by the teeth —17— terminate a sufficient distance short of the produced ends of said radial lines to permit the teeth of the gate or valve —9— to disengage from those of the rack when the valve is in its extreme closed or extreme opened positions, thus permitting the valve to be freely rotated in one direction about its axis in either of its extreme positions without changing the position of such axis to enable the contact faces of said valve and its seats to be closely fitted to each other by the friction produced by such free rotation, to reduce leakage to a minimum.

The ends of the tracks —18— beyond the ends of the toothed rack —17— are curved to conform to the curvature of the bearing faces —20— of the gate, the curvature at one end being concentric with the axis of the passage —7—, while that at the other end is reversely curved about the axis of the valve when in its extreme opened position, each of said curved surfaces as —22— and —22'— constituting a bearing about which the valve may be freely rotated when grinding them to their seats on the inner faces of the sections —2— and —3—.

The operation of the device is as follows:—

Assuming that the valve or gate is in its closed position as shown by full lines in Figures 1 and 2, and that it is desired to open the same, then by rotating the hand-wheel —16— in the proper direction, the valve will be rotated in the direction indicated by arrow "x," Figure 2, through the medium of the worm —12— and gear —10—, thereby causing the teeth of said valve to engage the teeth —17— by which the valve will be positively rolled along said rack to the position shown by dotted lines or to any intermediate position, it being understood that the worm and gear connection —12— and —10— with the valve will serve to hold the latter in any position of adjustment.

A reverse movement of the hand-wheel —16— will cause a similar reverse movement of the valve from its opened position and thereby return the valve to its closed position with a reverse rolling and sliding motion.

Now, owing to the fact that when the valve is in either of its extreme positions its teeth are disengaged from those of the rack —17—, it is evident that the continued operation of the mechanism by which the valve is returned to its closed position will cause said valve to be rotated about its axis with the peripheral valve teeth in contact with the bearings —22—, while on the other hand, if the operation of the valve operating mechanism in moving the valve from its closed position to its extreme opened position is maintained, the said teeth will be rotated freely about its axis against the bearing —22'— without changing the position of said axis, thereby permitting the contact faces of said valve with its seats to be ground or polished into close fitting engagement with said seats to reduce the liability of leakage to a minimum, particularly when the valve is closed.

Owing to the fact that the pressure of the liquid is always in one direction, toward the outlet end of the passage —7—, it is evident that the contacting faces at the corresponding side of the valve and seat will be susceptible to greater wear than those at the opposite side or end, and owing to the symmetrical construction of the valve, both ends being alike, it may be reversed end for end in case either end should become worn to such an extent as to cause leakage, but when the valve is closed, the pressure on the inner end thereof serves to keep the opposite end in sufficiently close contact with the corresponding seat to prevent leakage, even though the opposite end may not fit as tightly against its seat, although the intent is to have both ends of the valve fit snugly against both seats to form liquid-tight joints.

The circular ends of the track —18— which register with the circular portions —20— of the valve are extended at —22"— beyond the corresponding bearings —22'— and —22— to afford clearance for the portions —20— when the teeth of the valve are rotated against the bearings —22— and —22'— thereby causing said teeth to remove any scale which may adhere to the parts —22— and —22'—, which scale may be blown off through a supplemental valve —23— when the main valve is opened.

What I claim is:

1. In a valve mechanism of the character described, the combination of a case having a passage therethrough, and a chamber extending some distance to one side of and at right angles to the passage, a valve movable in said chamber to and from a position across said passage and having an independent rotary movement about its axis, means for rotating the valve in one direction about its axis while in its closed position and also for rotating the valve in a reverse direction, and means cooperating with the first named means for causing said valve to move from its closed position toward an open position with a rolling motion when its direction of rotation is reversed.

2. In a valve mechanism of the character described, a case having a lengthwise passage therethrough and a chamber extending some distance to one side said passage, one end wall of said chamber being substantially concentric with the passage and both end walls being semi-circular but reversely curved to form bearings, a valve movable in said chamber to and from a position across said passage and having a circular bearing face adapted when in its closed position to engage one bearing face and when in its extreme opened position to engage the other bearing face, and means for rotating the valve about its axis when engaged with either of said bearing faces.

3. In a valve mechanism of the character described, a case having a lengthwise passage therethrough and a chamber extending some distance to one side said passage, one end wall of said chamber being substantially concentric with the passage and both end walls being semi-circular but reversely curved to form bearings, a valve movable in said chamber to and from a position across said passage and having a circular bearing face adapted when in its closed position to engage one bearing face and when in its extreme opened position to engage the other bearing face, means for rotating the valve about its axis when engaged with either of said bearing faces, and means cooperating with the first named means for causing the valve to shift from its closed to its opened position with a rolling, sliding motion when rotated in one direction.

4. In a valve mechanism of the character described, a case having a lengthwise passage therethrough and a chamber extending some distance to one side said passage, one end wall of said chamber being substantially concentric with the passage and both end walls being semi-circular but reversely curved to form bearings, a valve movable in said chamber to and from a position across said passage and having a circular bearing face adapted when in its closed position to engage one bearing face and when in its extreme opened position to engage the other bearing face, means for rotating the valve about its axis when engaged with either of said bearing faces, and means cooperating with the first named means for causing the valve to shift from its closed to its opened position with a rolling, sliding motion when rotated in one direction, to shift from its opened to its closed position with a reverse rolling, sliding motion when rotated in a reverse direction.

5. In a valve mechanism of the character described, the combination of a case having a passage therethrough and a valve chamber extending some distance to one side said passage, a toothed rack along one side of the chamber, a valve movable in said chamber to and from a position across said passage and provided with a gear for engagement with said rack, the end walls of the valve chamber being extended a distance beyond both ends of the rack to allow the gear to disengage therefrom when the valve is in its closed and full open positions, and means for rotating the valve.

6. In a valve mechanism of the character described, the combination of a case having a passage therethrough and a chamber extending some distance to one side said passage, a toothed rack along one of the walls of the chamber, a semi-circular bearing at one end of the rack, a valve having a circular bearing face for engaging said bearing, said valve having a circular row of teeth for engaging said rack but disengaged therefrom when engaged with the semi-circular bearing, and means for rotating the valve in one direction to cause it to turn about its axis against the semi-circular bearing and for reversing its direction of rotation to cause it to engage the teeth of the rack for moving it relatively to the passage with a rolling sliding motion.

7. In a valve mechanism of the character described, the combination of a case having a passage therethrough and a chamber extending some distance to one side said passage, a pinion mounted in the chamber at one side of the passage, a toothed rack concentric with the axis of the pinion, a valve having gear teeth meshing with the pinion, means for rotating the pinion to cause the gear teeth of the valve to engage the teeth of the rack whereby said valve will be shifted from one position to another with a rolling, sliding motion, and a semi-circular bearing against which the valve is rotated after leaving the rack, said bearing being a sufficient distance beyond the corresponding end of the rack to permit free rotation of the valve without changing the position of its axis.

8. In a valve mechanism of the character described, the combination of a case having a passage therethrough and a chamber extending some distance to one side said passage, a toothed rack along one side of the chamber, semi-circular bearings at opposite ends of the chamber and beyond the adjacent ends of the rack, a toothed valve rotatable against either bearing without changing the position of its axis, and also movable into engagement with the rack for causing it to rotate with a rolling, sliding motion from one bearing to the other, and means for rotating said valve.

9. In a valve mechanism of the character described, the combination of a case having a passage therethrough and a chamber extending some distance to one side said passage, a pinion rotatably mounted in the chamber at one side of the passage, a hand-operated worm for driving the pinion, a toothed rack concentric with the axis of the pinion, semi-circular bearings at opposite ends of the rack, a toothed valve movable into and out of engagement with both bearings and to and from a position across the passage and also movable into and out of engagement with the teeth of the rack.

In witness whereof I have hereunto set my hand this 29th day of September, 1919.

WILLARD A. KITTS, Jr.

Witnesses:
H. E. CHASE.
MARGARET L. STORYS.